(12) United States Patent
Suzuki et al.

(10) Patent No.: US 6,314,062 B1
(45) Date of Patent: Nov. 6, 2001

(54) MAGNETO-OPTICAL DISK APPARATUS THAT CAN ADJUST POSITION OF MAGNETIC HEAD WITH RESPECT TO OPTICAL HEAD

(75) Inventors: Yoshihisa Suzuki, Bisai; Sayoko Tanaka, Anpachi-gun, both of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/464,777

(22) Filed: Dec. 16, 1999

(30) Foreign Application Priority Data

Dec. 17, 1998 (JP) .................................. 10-359226

(51) Int. Cl.[7] ..................................... G11B 11/00
(52) U.S. Cl. ............................................. 369/13
(58) Field of Search ............................. 369/13, 14, 116; 360/114, 59

(56) References Cited

U.S. PATENT DOCUMENTS

| | | | |
|---|---|---|---|
| 5,193,080 | * 3/1993 | Mohri et al. | 369/13 |
| 5,367,508 | * 11/1994 | Haba | 369/13 |
| 5,471,439 | * 11/1995 | Katayama et al. | 369/13 |
| 5,485,435 | * 1/1996 | Matsuda et al. | 369/13 |
| 6,185,162 | * 2/2001 | Kunimatsu et al. | 369/13 |

* cited by examiner

Primary Examiner—Tan Dinh
(74) Attorney, Agent, or Firm—Armstrong, Westerman, Hattori, McLeland & Naughton, LLP

(57) ABSTRACT

A magnetic head which can apply magnetic fields in opposite directions from each other within a beam spot formed on a magneto-optical disk. This magnetic head includes two cores located in close proximity and two coils. The level of the magneto-optical signal output from the optical head becomes greater as a function of deviation of the center of the magnetic head from the center of the laser beam. Therefore, the magnetic head is moved in the tracking direction or the track direction so that the level of the magneto-optical signal becomes 0.

11 Claims, 16 Drawing Sheets

MAGNETO-OPTICAL DISK APPARATUS THAT CAN ADJUST POSITION OF MAGNETIC HEAD WITH RESPECT TO OPTICAL HEAD

BACKGROUND OF THE INVENTION

1. Field of the Invention

The present invention relates to magneto-optical disk apparatuses, and more particularly, to a magneto-optical disk apparatus that can adjust the position of the magnetic head with respect to the optical head.

2. Description of the Background Art

Attention is focused on a magneto-optical recording medium as a rewritable recording medium of great storage capacity and high reliability. The magneto-optical recording media are now applied as computer memories and the like. Standardization of a magneto-optical recording medium having a storage capacity of 6.0 Gbytes (AS-MO (Advanced Storage Magneto-optical Disk) standard) is in progress to be provided for actual usage. This magneto-optical recording medium of high density has the signal reproduced by the MSR (Magnetically Induced Super Resolution) method. More specifically, a laser beam is projected to transfer the magnetic domain of the recording layer of the magneto-optical recording medium to a reproduction layer and also forming a detection window in the reproduction layer to allow detection of only the transferred magnetic domain. The transferred magnetic domain is detected from the formed detection window.

Also, a magnetic domain enlargement reproduction technology has been developed. An alternating magnetic field is applied in reproducing a signal from a magneto-optical recording medium. The magnetic domain of the recording layer is enlarged to the reproduction layer by the laser beam and the alternating magnetic field while transferring to reproduce a signal. A magneto-optical recording medium that can record or reproduce signals of 14 Gbytes by virtue of this technology has been proposed.

It is expected that signals will be recorded or reproduced at further higher density, in which case the frequency of the alternating magnetic field is increased. It is therefore necessary to reduce the diameter of the coil that generates the magnetic field to approximately 20 $\mu$m from the current diameter of approximately 200 $\mu$m. In the case where the diameter of the coil is approximately 200 $\mu$m, which is sufficiently greater than the diameter of the beam spot, it was only required to have the magnetic head roughly follow the optical head. However, in the case where the diameter of the coil becomes as small as approximately 20 $\mu$m, any slight deviation of the center of the magnetic field from the center of the laser beam will impede proper recording or reproduction of signals.

SUMMARY OF THE INVENTION

An object of the present invention is to provide a magneto-optical disk apparatus capable of correct recording and/or reproduction of signals.

Another object of the present invention to provide a magneto-optical disk apparatus that can set the position of the magnetic head in coincidence with the position of the optical head.

According to an aspect of the present invention, a magneto-optical disk apparatus includes an optical head and a magnetic head. The optical head is provided to face a magneto-optical disk. The magnetic head applies a first magnetic field and a second magnetic field of a direction opposite to that of the first magnetic field within a beam spot formed on a magneto-optical disk by a laser beam directed from the optical head towards the magneto-optical disk.

Preferably, the magnetic head includes a first magnetic element and a second magnetic element. The first magnetic element generates a first magnetic field. The second magnetic element is provided apart from the first magnetic element, and generates a second magnetic field.

Preferably, the magneto-optical disk apparatus further includes a position adjustment unit that adjusts the position of the magnetic head in response to a magneto-optical signal output from the optical head.

Further preferably, the position adjustment unit includes a position adjustment circuit and a position adjustment mechanism. The position adjustment circuit generates a drive signal to adjust the position of the magnetic head in response to a magneto-optical signal output from the optical head. The position adjustment mechanism responds to the drive signal from the position adjustment circuit to move the magnetic head in the radial direction of the magneto-optical disk and/or in the direction of the tangent of the track of the magneto-optical disk.

The main advantage of the present invention is that correct signal recording or reproduction is allowed because two magnetic fields in opposite directions are applied in the beam spot to eliminate deviation in the position of the magnetic head with respect to the optical head according to a magneto-optical signal output from the optical head.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 9A–9C are waveform diagrams representing magneto-optical signals output from the optical heads corresponding to FIGS. 6–8.

DESCRIPTION OF THE PREFERRED EMBODIMENTS

Figure 1:
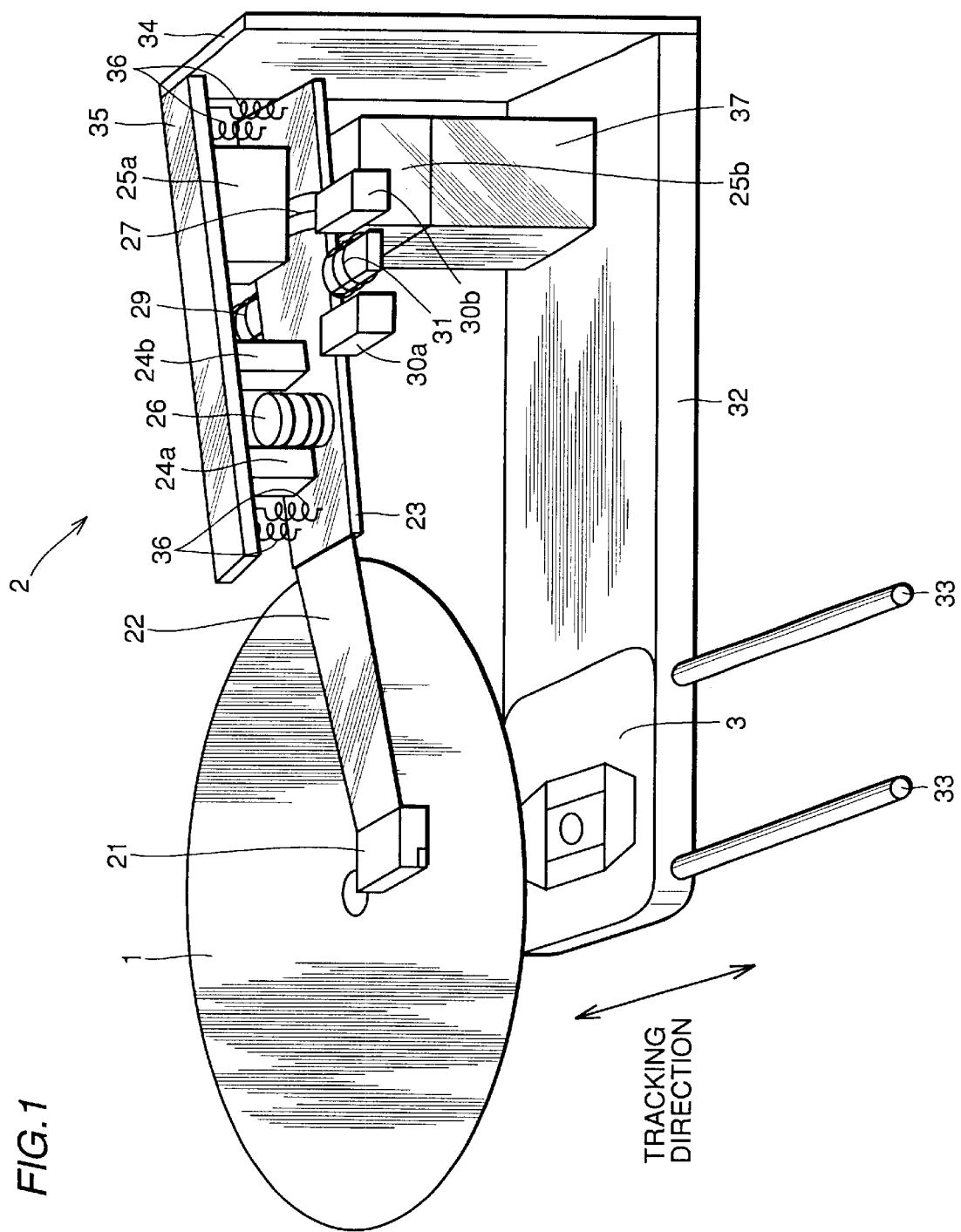
FIG. 1 is a perspective view showing a structure of an optical head and a magnetic head of a magneto-optical disk apparatus according to an embodiment of the present invention.

Embodiments of the present invention will be described in detail hereinafter with reference to the drawings. In the drawings, the same or corresponding components have the same reference characters allotted, and description thereof will not be repeated.

[Structure of Magnetic Head and Optical Head]

Figure 2:
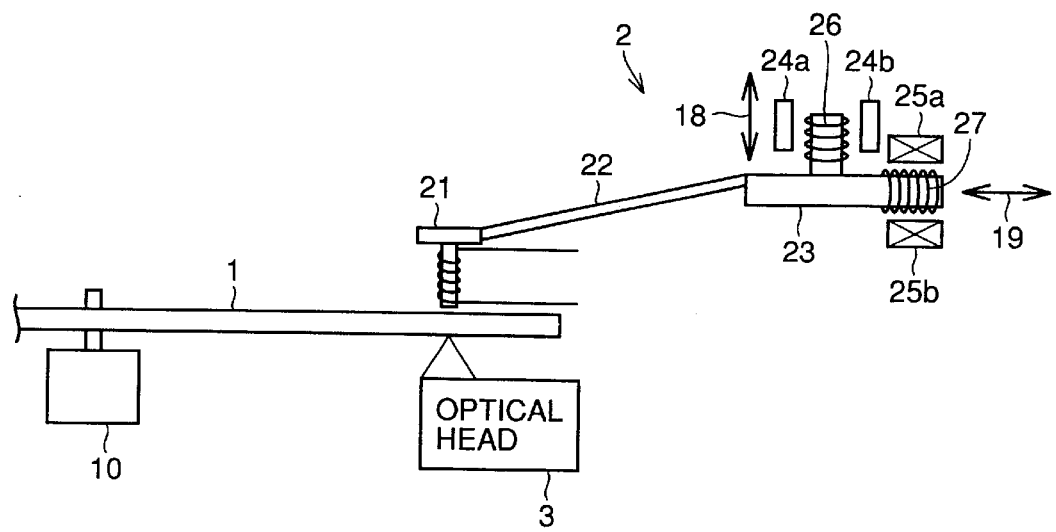
FIG. 2 is a side cross sectional view of the optical head and the magnetic head of FIG. 1.
Figure 3:
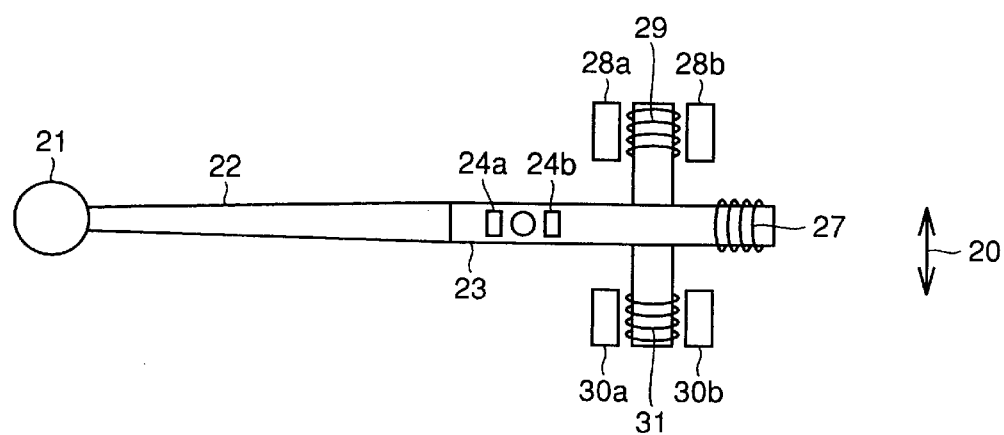
FIG. 3 is an upper cross sectional view of the optical head and the magnetic head of FIG. 1.

Referring to FIGS. 1–3, an optical head 3 that directs a laser beam to a magneto-optical disk 1 to record or reproduce a signal is provided to face magneto-optical disk 1. A magnetic head 21 that applies a magnetic field to magneto-optical disk 1 is provided to face magneto-optical disk 1 at the side opposite to optical head 3. Magneto-optical disk 1 is rotated at a predetermined rotational speed by a spindle motor 10.

A spread frame 32 is attached to optical head 3. Spread frame 32 is supported by two parallel rods 33 that extend in the radial direction of magneto-optical disk 1 (also referred to as "tracking direction" hereinafter), whereby travel in the tracking direction is allowed. Magnetic head 21 is attached to spread frame 32 via an arm 22 and a position adjustment mechanism 2. Therefore, magnetic head 21 moves in the tracking direction following optical head 3.

Position adjustment mechanism 2 includes an upper substrate 35 fixed to spread arm 32 via a side plate 34, a lower substrate 23 hanging from upper substrate 35 by means of a spring 36, coils 26, 27, 29 and 31 provided at lower substrate 23, magnets 24a, 24b and 25a fixed to upper substrate 35, magnets 28a, 28b, 30a and 30b fixed to a side plate (not shown), and a magnet 25b fixed to spread frame 32 via a base 37. Coil 26 is wound around an upright core on lower substrate 23. Coil 27 is wound around lower substrate 23. Coils 29 and 31 are respectively wound around cores protruding from both sides of lower substrate 23. Magnets 24a and 24b face each other with coil 26 therebetween. Magnets 25a and 25b face each other with coil 27 therebetween. Magnets 28a and 28b face each other with coil 29 therebetween. Magnets 30a and 30b face each other with coil 31 therebetween.

Figure 4:
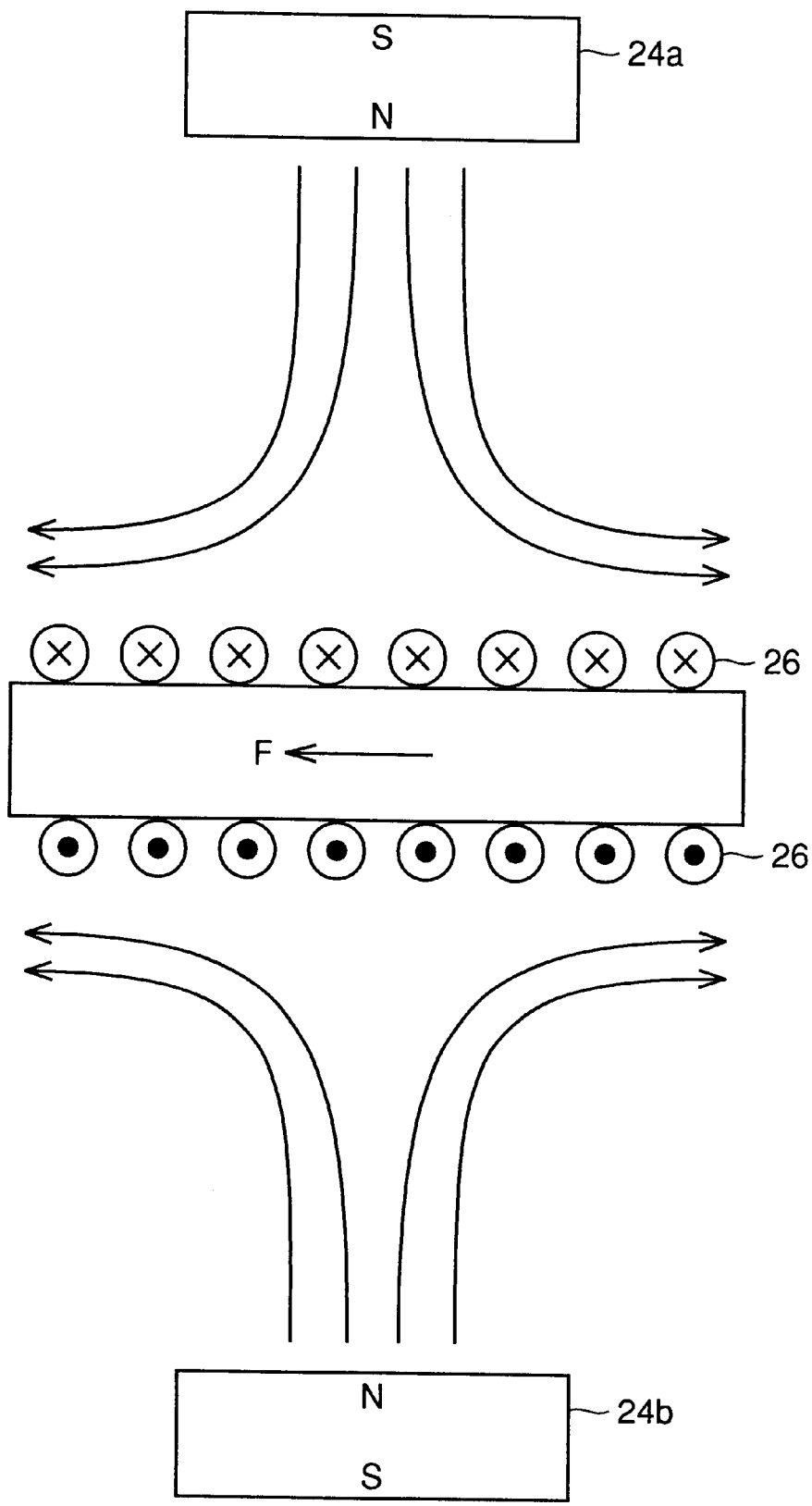
FIG. 4 is a diagram to describe the action of the coil and magnetic heads located at both sides thereof in FIGS. 1 and 2.

As shown in FIG. 4, magnetic heads 24a and 24b face each other with the N pole at the inner side. Therefore, the line of magnetic force from magnet 24a collides with the line of magnetic force from magnet 24b within coil 26 to be directed outwards. Therefore, a downward magnetic field is generated in the upper portion of coil 26, whereby Lorentz force F is generated leftwards. Also, an upward magnetic field occurs at the lower portion of coil 26, whereby Lorentz force F is generated leftwards. When a current flows in a direction opposite thereto in coil 26, a Lorentz force of an opposite direction is generated. As a result, coil 26 moves in the vertical direction 18 as shown in FIG. 2. Magnetic head 21 follows this movement.

Coil 27 and magnets 25a and 25b are formed in a similar manner. Therefore, coil 27 moves in the radial direction of magneto-optical disk 1 as shown in FIG. 2, and magnetic head 21 follows this movement. Coils 29 and 31 and magnets 28a, 28b, 30a and 30b are formed in a similar manner. Therefore, coils 29 and 31 move in the tangential direction (also referred to as "track direction" hereinafter) 20 of tracks (not shown) formed spirally or concentrically of magneto-optical disk 1, and magnetic head 21 follows this movement.

Magnetic head 21 is the flying type head having a flying distance depending upon the rotational speed of magneto-optical disk 1. By controlling the amount and direction of the current flowing in coil 26, the distance between magnetic head 21 and magneto-optical disk 1 is maintained constant. Also, magnetic head 21 is moved in the tracking direction and the track direction by controlling the amount and direction of the current flowing through coils 27, 29 and 31 to adjust the position of magnetic head 21 with respect to optical head 3.

Figure 5:
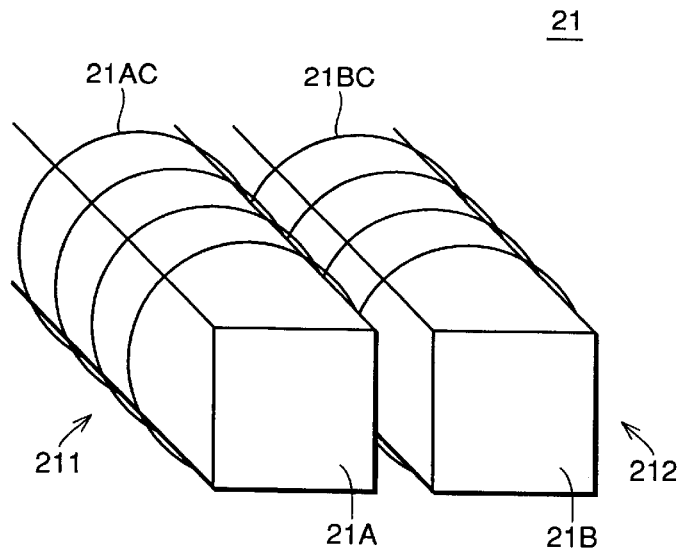
FIG. 5 is a perspective view showing the main structure of the magnetic head of FIGS. 1–3.

Referring to FIG. 5, magnetic head 21 includes two magnetic elements 211 and 212. Magnetic elements 211 and 212 are arranged in close proximity. Magnetic element 211 includes a magnetic core 21A formed of ferrite and the like, and a coil 21AC wound around core 21A. Magnetic element 212 includes a magnetic core 21B similarly formed of ferrite and the like, and a coil 21BC wound around core 21B. A current can be conducted independently to coils 21AC and 21BC. When currents of different directions are conducted to coils 21AC and 21BC, magnetic elements 211 and 212 generate magnetic fields in different directions. When currents of the same direction are conducted to coils 21AC and 21BC, a magnetic field of the same direction is generated by each of magnetic elements 211 and 212. Since magnetic elements 211 and 212 are located extremely close to each other, they can be regarded as one magnetic element when a magnetic field of the same direction is generated.

Magnetic elements 211 and 212 are arranged in the tracking direction. Each size of cores 21A and 21B is approximately 14 μm square, for example. However, it is expected that this size is further reduced in accordance with increase in the density of magneto-optical disks 1.

[Principle of Position Adjustment]

Figure 6:
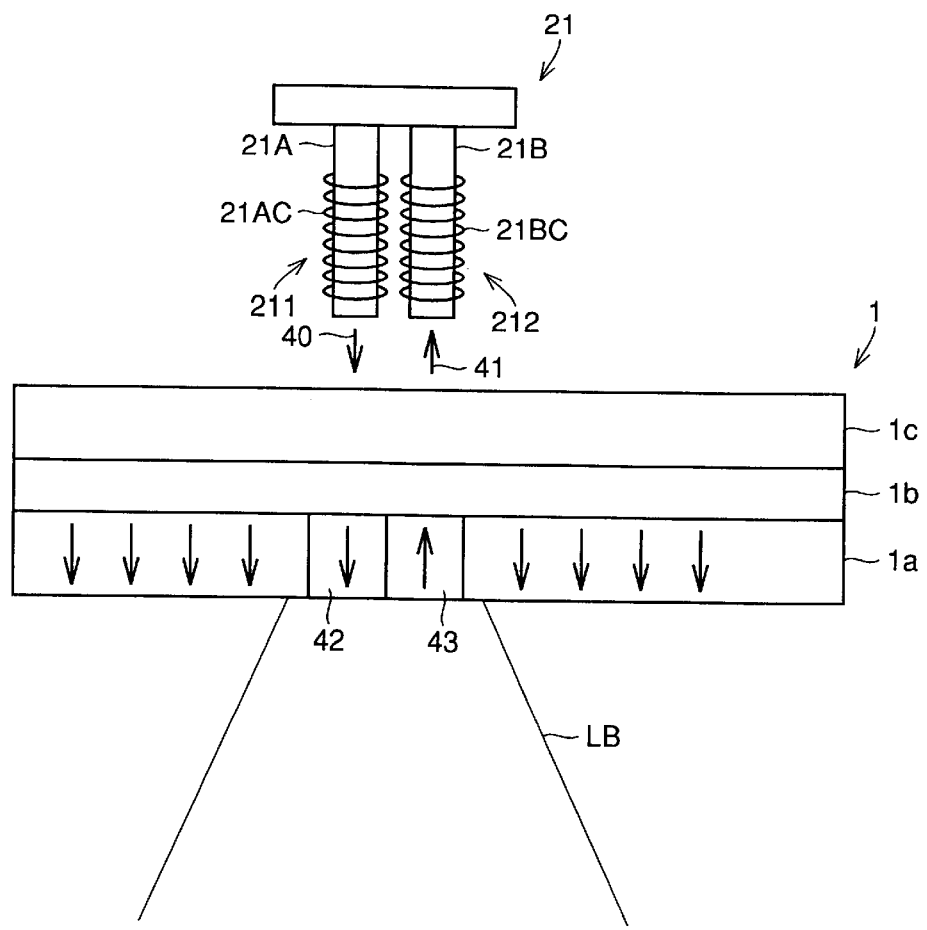
FIG. 6 is a diagram to describe the function when the center of the magnetic head of FIG. 1 is in coincidence with the center of the laser beam from the optical head.

The principle of position adjustment of magnetic head 21 with respect to optical head 3 of the present embodiment will be described hereinafter. Referring to FIG. 6, magneto-optical disk 1 includes a reproduction layer 1a formed of a magnetic material, an intermediate layer 1b formed of a nonmagnetic material, and a recording layer 1c formed of a magnetic material. A laser beam LB is directed from the reproduction layer 1a side by optical head 3. Magnetic fields 40 and 41 are applied from the recording layer 1c side by magnetic head 21. Since a current can be conducted independently to coils 21AC and 21BC, a current of a certain direction is conducted to coil 21AC and a current of a different direction is conducted to coil 21BC. Accordingly, magnetic elements 211 and 212 apply magnetic fields 40 and 41 of opposite directions to each other to magneto-optical disk 1. Upon radiation of laser beam LB, a beam spot of a predetermined size is formed on magneto-optical disk 1. Because the region of reproduction layer 1*a* corresponding to this beam spot is heated to above a predetermined temperature, the magnetization is inverted by magnetic fields 40 and 41. As a result, a magnetic domain 42 with magnetization in a direction identical to that of magnetic field 40, and a magnetic domain 43 with magnetization in a direction identical to that of magnetic field 41 are formed in this region that exceeds the predetermined temperature.

Figure 7:
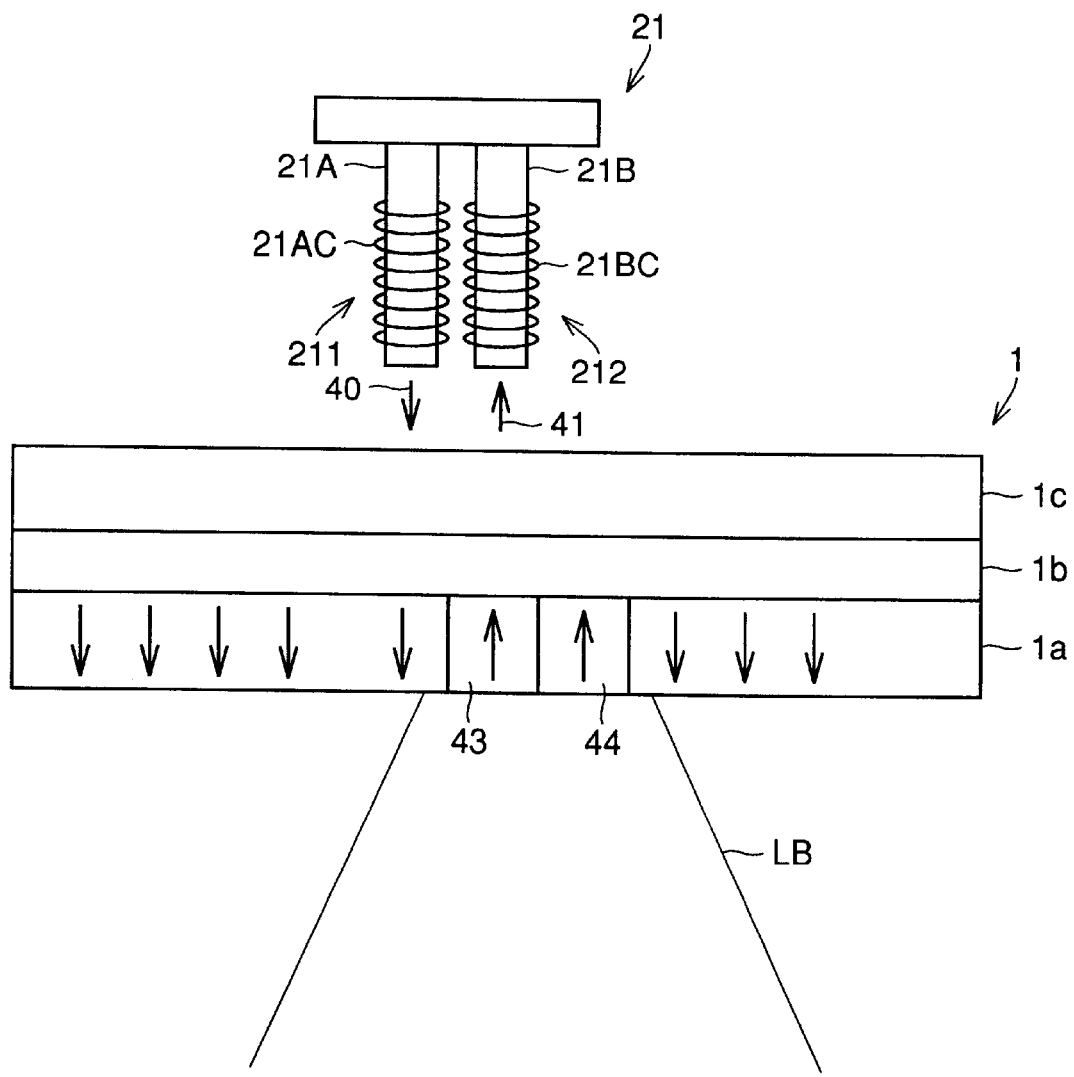
FIG. 7 is a diagram to describe the function when the center of the magnetic head of FIG. 1 is shifted leftwards in the drawing from the center of the laser beam from the optical head.

Referring to FIG. 7, magnetization in the beam spot is inverted by magnetic field 41 when the center of magnetic head 21 is deviated leftwards in the drawing from the center of laser beam LB. As a result, magnetic domains 43 and 44 with magnetization in a direction identical to that of magnetic field 41 are formed at the region that exceeds the predetermined temperature.

Figure 8:
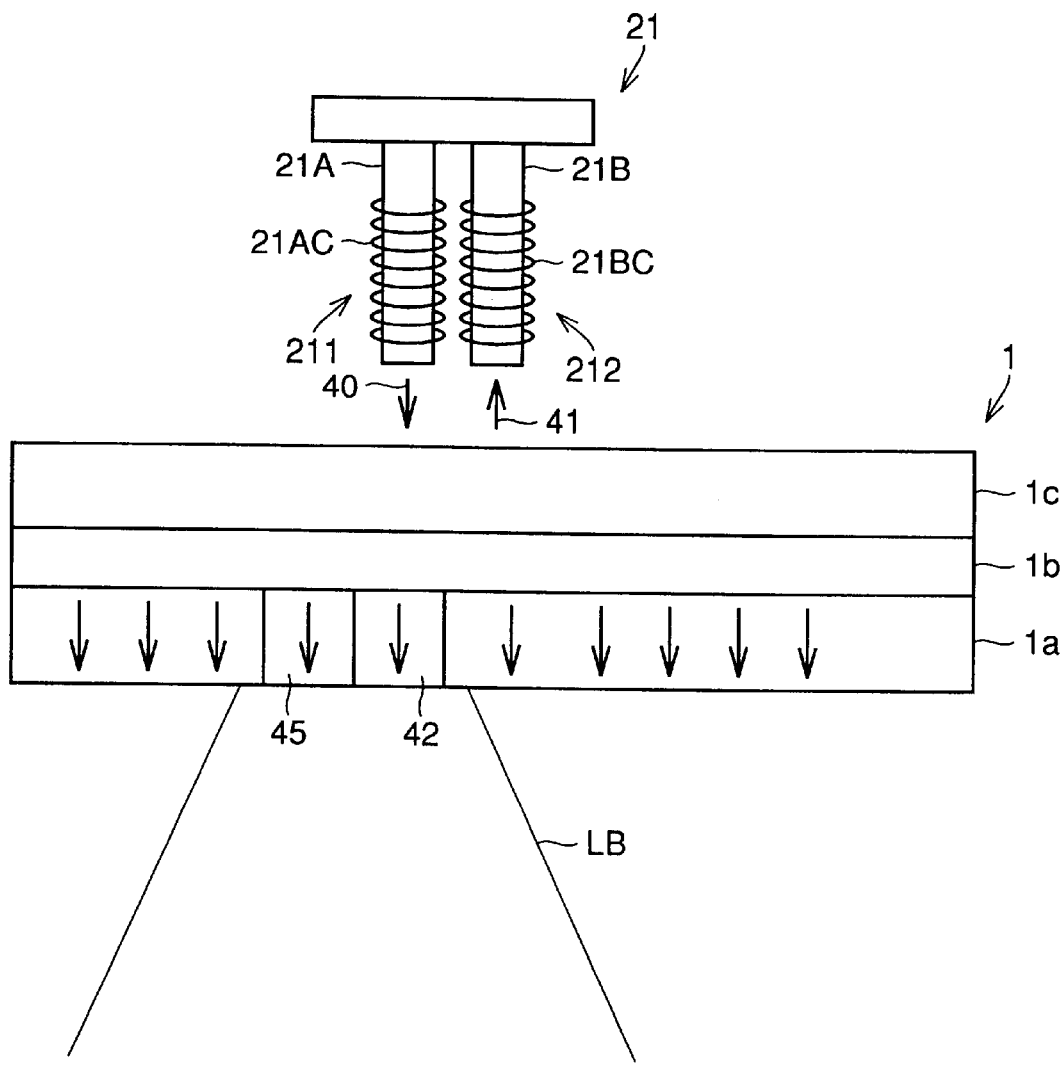
FIG. 8 is a diagram to describe the function when the center of the magnetic head of FIG. 1 is shifted rightwards in the drawing from the center of the laser beam of the optical head.

Referring to FIG. 8, magnetic domains 42 and 45 in the beam spot both have magnetization in a direction identical to that of magnetic field 40 when the center of magnetic head 21 is deviated rightwards in the drawing from the center of laser beam LB.

In the case where magnetic domains 42 and 43 with magnetization directions differing from each other are formed in the one beam spot as shown in FIG. 6, the Kerr effect by magnetic domain 42 and the Kerr effect by magnetic domain 43 are offset, whereby the level of the magneto-optical signal output from optical head 3 becomes 0 as shown in FIG. 9A.

In the case where magnetic domains 43 and 44 of the same magnetic direction (upwards in the drawing) are formed in one beam spot as shown in FIG. 7, the Kerr effect by magnetic domain 43 and the Kerr effect by magnetic domain 44 are added, whereby the level of the magneto-optical signal output from optical head 3 becomes positive as shown in 9B.

In the case where magnetic domains 42 and 45 of the same magnetization direction (downwards in the drawing) are formed in one beam spot as shown in FIG. 8, the Kerr effect by magnetic domain 42 and the Kerr effect by magnetic domain 45 are added, whereby the level of the magneto-optical signal output from optical head 3 becomes negative as shown in FIG. 9C.

Thus, the level of the magneto-optical signal becomes 0 when the center of magnetic head 21 coincides with the center of laser beam LB. However, the level of the magneto-optical signal becomes great when the center of magnetic head 21 is deviated from the center of laser beam LB. The level of this magneto-optical signal becomes greater as a function of deviation, and the polarity is inverted according to the direction of deviation.

By applying magnetic fields differing from each other at an extremely close distance, the amount of deviation of magnetic head 21 with respect to optical head 3 can be detected. By controlling the position of magnetic head 21 so that the amount of deviation becomes 0, the center of magnetic head 21 can be set to always match the center of laser beam LB.

[Another Example of Magnetic Head]

In the above-described example, magnetic elements 211 and 212 are arranged in the tracking direction. Therefore, the amount of deviation in the tracking direction can be detected. However, the amount of deviation in the track direction cannot be detected. Although the amount of deviation in the track direction can be detected by arranging magnetic elements 211 and 212 in the track direction, then the amount of deviation in the tracking direction can no longer be detected. Both the amount of deviation in the tracking direction and the track direction cannot be detected at the same time with magnetic head 21 employing two magnetic elements 211 and 212.

Figure 10:
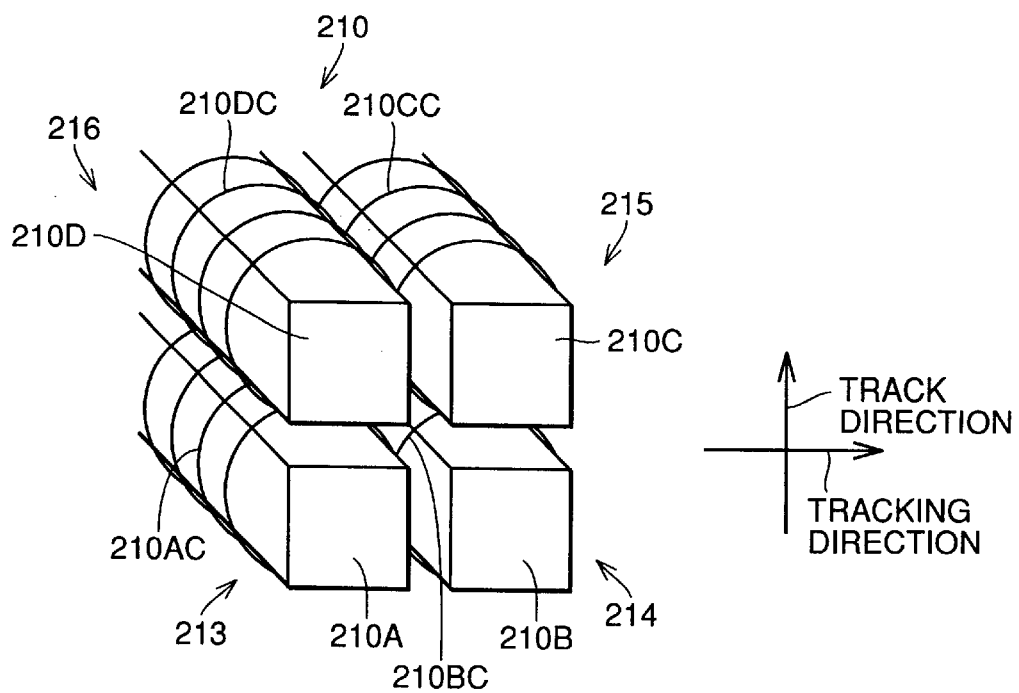
FIG. 10 is a perspective view showing another example of a magnetic head.

In view of the foregoing, a magnetic head 210 that includes four magnetic elements 213–216 as shown in FIG. 10 is preferably employed. Magnetic head 213 includes a core 210A and a coil 210AC wound around core 210A. Magnetic element 214 includes a core 210B and a coil 210BC wound around core 210B. Magnetic element 215 includes a core 210C and a coil 210CC wound around core 210C. Magnetic element 216 includes a core 210D and a coil 210DC wound around core 210D. A current can be conducted independently to coils 210AC, 210BC, 210CC and 210DC. Magnetic elements 213 and 214 are arranged in the tracking direction, and magnetic elements 215 and 216 are also arranged in the tracking direction. Magnetic elements 213 and 216 are arranged in the track direction, and magnetic elements 214 and 215 are also arranged in the track direction.

In the case where the amount of deviation in the tracking direction is detected using magnetic head 210, a current of the same direction is conducted to coils 210AC and 210DC to apply a magnetic field of the same direction from magnetic elements 213 and 216 to magneto-optical disk 1, and a current of a direction opposite to that above is conducted to coils 210BC and 210CC to apply a magnetic field of a direction opposite to that above from magnetic elements 214 and 215 to magneto-optical disk 1. Accordingly, magnetic elements 213 and 216 and magnetic elements 214 and 215 apply a magnetic field in opposite directions to allow detection of the amount of deviation in the tracking direction.

When the amount of deviation in the track direction is to be detected, a current of the same direction is conducted to coil to coils 210AC and 210BC to apply a magnetic field of the same direction from magnetic elements 213 and 214 to magneto-optical disk 1, and a current of a direction opposite to that above is conducted to coils 210CC and 210DC in order to apply a magnetic field of a direction opposite to that above from magnetic elements 215 and 216 to magneto-optical disk 1. Accordingly, magnetic elements 213 and 214 and magnetic elements 215 and 216 apply a magnetic field opposite in direction from each other to allow detection of the amount of deviation in the track direction.

By employing a magnetic head 210 including such four magnetic elements 213–216 to detect the amount of deviation in both the tracking and track directions, the position of magnetic head 21 can be controlled by setting the amount of deviation thereof to 0. By controlling the amount and direction of the current conducted to coils 29 and 31 shown in FIGS. 1 and 3 according to the amount of deviation in the tracking direction, deviation of magnetic head 21 in the tracking direction can be eliminated. Also, by controlling the amount and direction of current conducted to coil 27 shown in FIGS. 1–3 according to the amount of deviation in the track direction, deviation of magnetic head 21 in the track direction can be eliminated.

Figure 11:
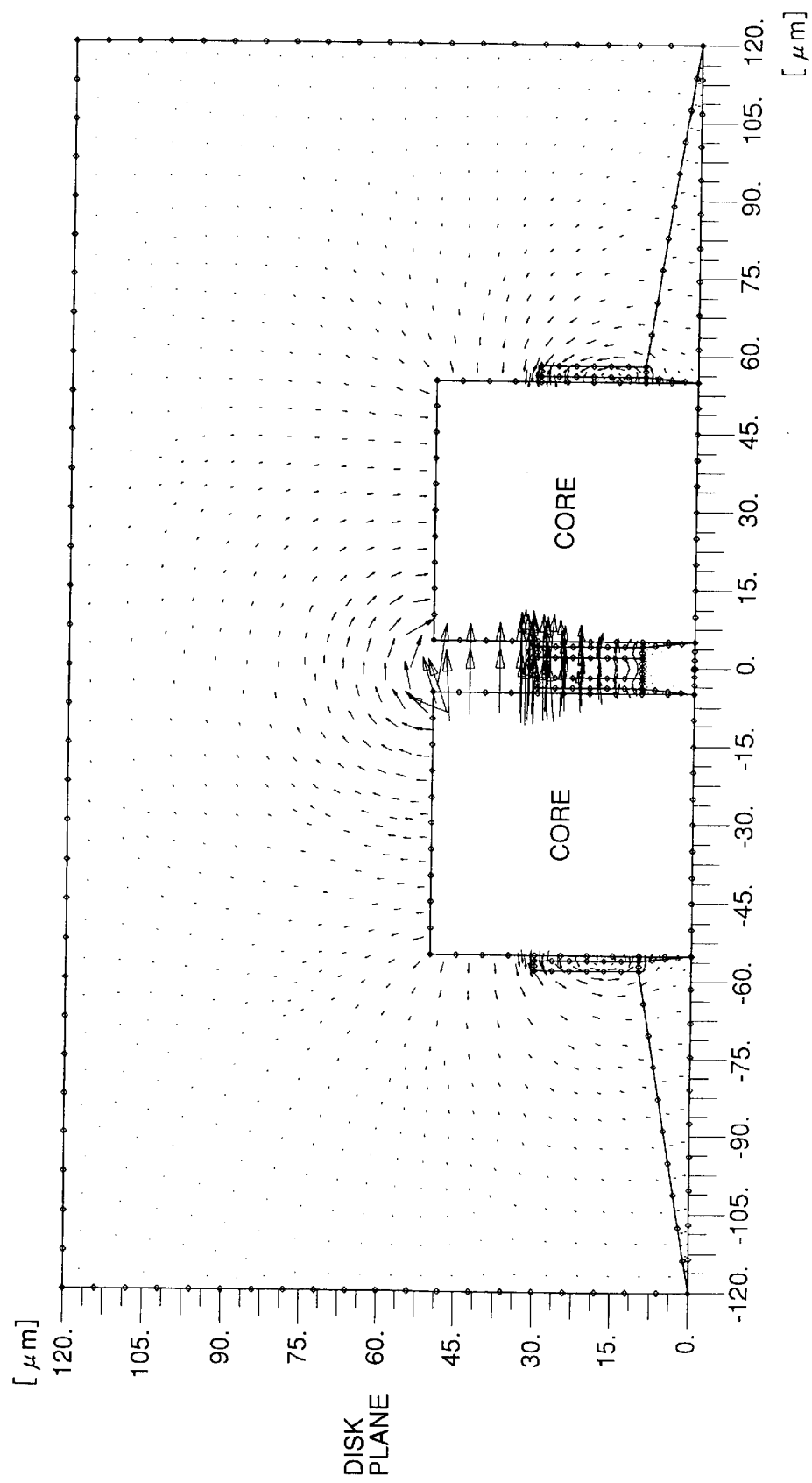
FIG. 11 is a magnetic figure showing the simulation result of the magnetic field generated by the magnetic element of FIG. 5 or 10.

FIG. 11 shows the simulation result of the line of magnetic force in the case where the distance between cores is 10 $\mu$m, and the length of the core is 50 $\mu$m. In the case of a flying type magnetic head, a magnetic field opposite in direction from each other can be applied at a position distant by only several 10 μm from the disk since the disk plane is approximately 10 μm apart from the core.

[Entire Structure of Magneto-optical Disk Apparatus]

Figure 12:
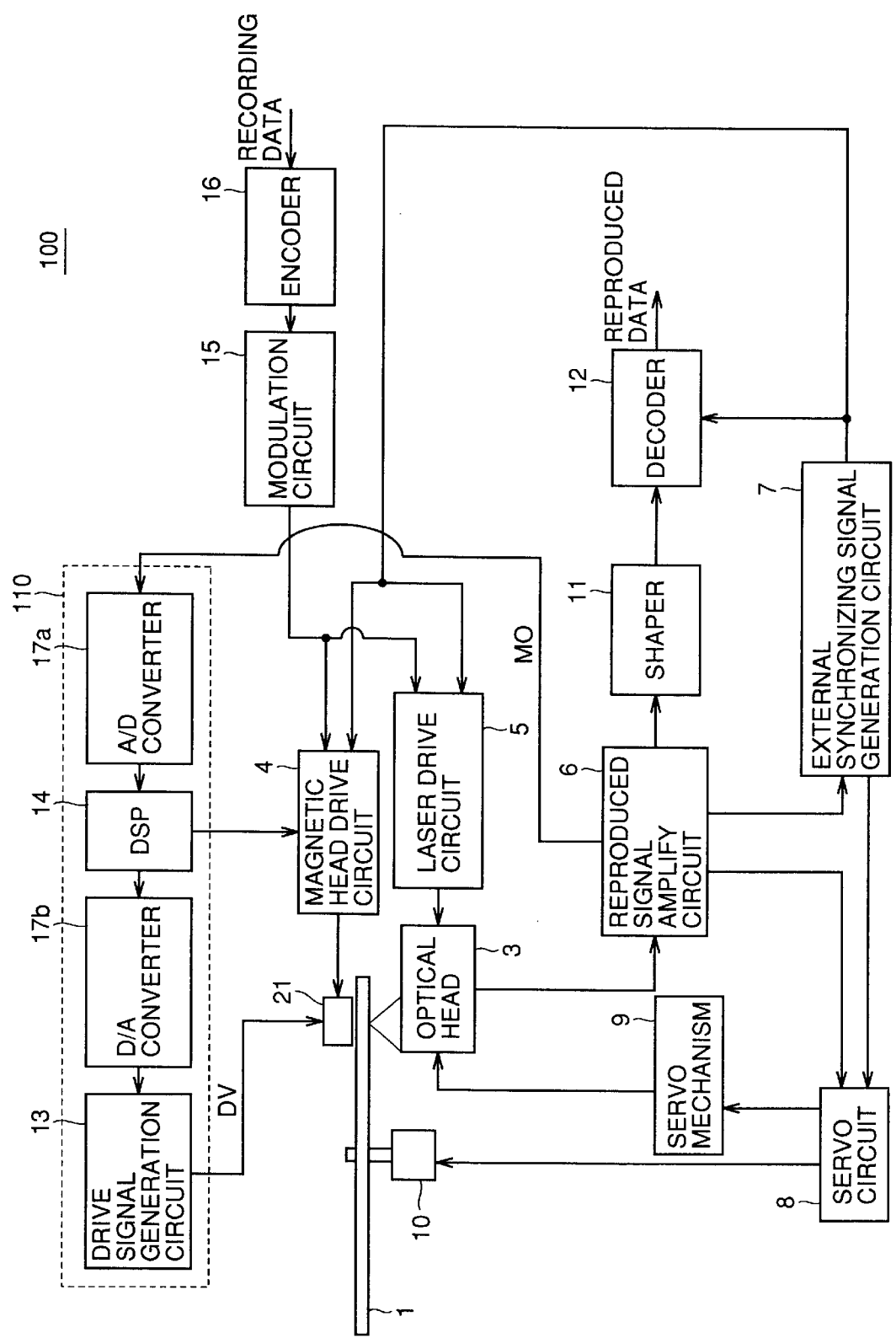
FIG. 12 is a block diagram showing an entire structure of a magneto-optical disk apparatus employing the magnetic head of FIG. 1.

Referring to FIG. 12, a magneto-optical disk apparatus that has the mechanism of adjusting the position of magnetic head 21 according to the detection of the amount of deviation between the optical axis of a laser beam emitted from optical head 3 and the center of magnetic head 21 will be described hereinafter.

A magneto-optical disk apparatus 100 includes a magnetic head 21, an optical head 3, a magnetic head drive circuit 4, a laser drive circuit 5, a reproduced signal amplify circuit 6, an external synchronizing signal generation circuit 7, a servo circuit 8, a servo mechanism 9, a spindle motor 10, a shaper 11, a decoder 12, a position adjustment circuit 110, a modulation circuit 15, and an encoder 16.

Magnetic head 21 applies a magnetic field to magneto-optical disk 1. Optical head 3 emits a laser beam of 635 in wavelength (tolerance±15 μm, the same applies hereinafter) onto magneto-optical disk 1, and detects light reflected therefrom. Magnetic head drive circuit 4 drives magnetic head 21 so that a predetermined magnetic field is generated.

Laser drive circuit 5 drives a semiconductor laser (not shown) in optical head 3. Reproduced signal amplify circuit 6 receives a tracking error signal, a focus error signal, a fine clock mark signal, and a magneto-optical signal detected by a photodetector (not shown) in optical head 3 and amplifies the signals to a predetermined level. Then, the tracking error signal and the focus error signal are provided to servo circuit 8. The fine clock mark signal is provided to external synchronizing signal generation circuit 7. The magneto-optical signal is applied to position adjustment circuit 110 and shaper 11.

External synchronizing signal generation circuit 7 generates an external synchronizing signal according to the fine clock mark signal from reproduced signal amplify circuit 6. That external synchronizing signal is output to servo circuit 8, decoder 12 and magnetic head drive circuit 4 (or laser drive circuit 5).

Servo circuit 8 controls servo mechanism 9 according to the tracking error signal and the focus error signal from reproduced signal amplify circuit 6. Servo mechanism 9 carries out tracking servo and focus servo of an objective lens (not shown) in optical head 3. Servo circuit 8 receives the external synchronizing signal from external synchronizing signal generation circuit 7 to rotate spindle motor 10 at a predetermined rotational speed in synchronization with that external synchronizing signal. Spindle motor 10 rotates magneto-optical disk 1 at the predetermined rotational speed. Shaper 11 cuts the noise of the magneto-optical signal from reproduced signal amplify circuit 6 and converts the signal into a digital signal. Decoder 12 demodulates the magneto-optical signal converted into a digital signal and outputs the demodulated signal as reproduced data. Encoder 16 encodes recorded data and provides the encoded data to modulation circuit 15. Modulation circuit 15 modulates the encoded recorded signal into a predetermined system to provide the modulated recorded signal to magnetic head drive circuit 4 when signal recording is carried out by the magnetic field modulation system, and to laser drive circuit 5 when signal recording is carried out by the light modulation system.

Position adjustment circuit 110 includes an AID converter 17a receiving a magneto-optical signal MO from reproduced signal amplify circuit 6, a DSP 14 receiving the magneto-optical signal from A/D converter 17a and detecting the level thereof, a D/A converter 17b receiving the level of the magneto-optical signal detected by DSP 14, and a drive signal generation circuit 13 generating a drive signal DV according to the level of the magneto-optical signal from D/A converter 17b. DSP 14 also controls magnetic head drive circuit 4 so that magnetic head 21 applies magnetic fields of opposite directions in one beam spot. Here, position adjustment circuit 110 responds to magneto-optical signal MO from reproduced signal amplify circuit 6 to detect deviation of magnetic head 21 with respect to optical head 3, and adjusts the position of magnetic head 21 so that there is no deviation in the detected position.

[Process of DSP]

The position adjustment operation of magnetic head 21 will be described with reference to the flow chart of FIG. 13.

At step S10, DSP 14 supplies a control signal to magnetic head drive circuit 4 so that magnetic head 21 applies magnetic fields in opposite directions in one beam spot. In response to this control signal, magnetic head drive circuit 4 supplies a drive signal to magnetic head 21. Therefore, currents of a direction opposite to each other are conducted to coils 21AC and 21BC of magnetic head 21 shown in FIG. 5. Magnetic fields 40 and 41 of a direction opposite to each other are applied from magnetic head 21 on magneto-optical disk 1, as shown in FIGS. 6–8.

Optical head 3 emitting laser beam LB to magneto-optical disk 1 detects the magnetization direction in the beam spot and outputs a magneto-optical signal. Reproduced signal amplify circuit 6 amplifies the magneto-optical signal output from optical head 3 and supplies the amplified signal to A/D converter 17a. A/D-converted magneto-optical signal MO is provided to DSP 14.

At step S11, DSP 14 detects the peak value of the magneto-optical signal, as shown in FIGS. 9A–9C.

At step S12, DSP 14 determines whether the detected peak value is 0 or not. If the peak value is 0, the center of magnetic head 21 matches the center of optical head 3. Therefore, the position adjustment operation ends. When the detected peak value is not 0, control proceeds to step S13 since the center of magnetic head 21 does not match the center of optical head 3.

At step S13, DSP 14 outputs the detected result of the peak value to D/A converter 17b. The peak level of the magneto-optical signal detected by DSP 14 is D/A-converted by D/A converter 17b to be supplied to drive signal generation circuit 13.

At step S14, drive signal generation circuit 13 generates a drive signal DV to dive magnetic head 21. Drive signal DV is supplied to coil 27 of position adjustment mechanism 2 shown in FIGS. 1–3.

At step S15, position adjustment mechanism 2 responds to drive signal DV to move magnetic head 21 in the tracking direction of magneto-optical disk 1.

The process of steps S10–S15 is repeated until the peak value of the magneto-optical signal becomes 0. Thus, the center of magnetic head 21 is made to coincide with the center of optical head 3.

In the general recording or reproduction of a signal, DSP 14 controls magnetic head drive circuit 4 so that magnetic head 21 applies magnetic fields of one direction within one beam spot. More specifically, magnetic head drive circuit 4 supplies a drive signal to magnetic head 21. In response to this drive signal, currents of the same directions are conducted to coils 21AC and 21C shown in FIG. 5. Therefore, magnetic elements 211 and 212 function as one magnetic element to generate a magnetic field of unitary direction. Magneto-optical disk apparatus 100 records a signal onto magneto-optical disk 1 by the magnetic field modulation system or the light modulation system. In the case of the magnetic field modulation system, the two magnetic elements 211 and 212 integrally generate a magnetic field that is altered according to the recording data. When a signal is to be reproduced by the magnetic domain enlargement reproduction method from magneto-optical disk 1, the two magnetic elements 211 and 212 integrally generate an alternating field.

[Further Example of Magnetic Head]

Figure 14:
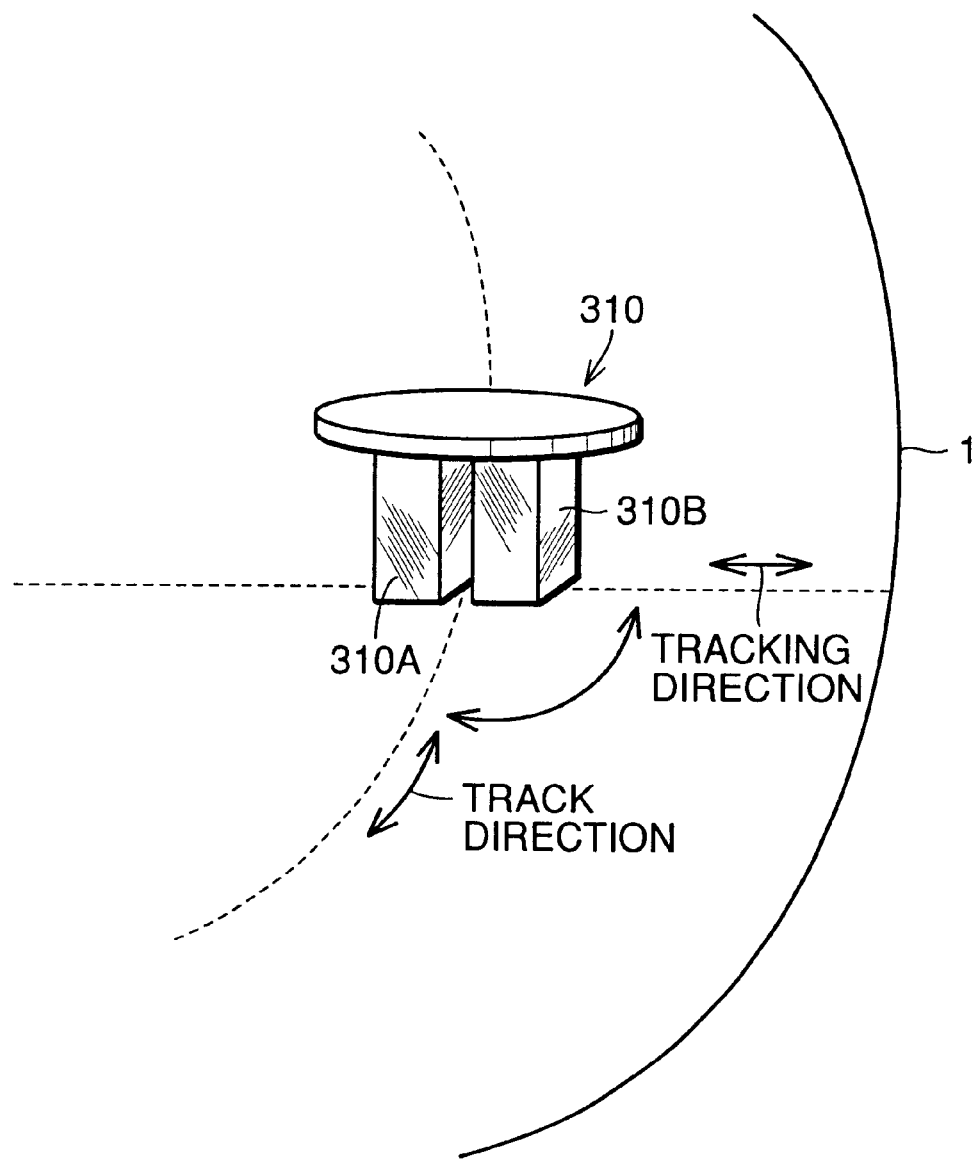
FIG. 14 is a perspective view showing a further example of a magnetic head.

Referring to FIG. 14, a magnetic head 310 includes two magnetic elements 310A and 310B, similar to magnetic head 21 of FIG. 5. Each of magnetic elements 310A and 310B includes a core and a coil wound around that core. Magnetic head 310 is rotatable 90 degrees in the main plane of magneto-optical disk 1. In FIG. 14, magnetic elements 310A and 310B are arranged in the tracking direction. When magnetic head 310 is rotated 90 degrees, magnetic elements 310A and 310B are arranged in the track direction.

By arranging magnetic elements 310A and 310B in the tracking direction in magnetic head 310 and applying magnetic fields of opposite directions from each other from magnetic elements 310A and 310B to magneto-optical disk 1 to detect a magneto-optical signal by optical head 3, the position deviation in the tracking direction of magnetic head 310 with respect to optical head 3 can be detected. Then, by rotating magnetic head 310 90 degrees to rearrange magnetic elements 310A and 310B from which magnetic fields in opposite directions from each other are applied to magneto-optical disk 1 to detect a magneto-optical signal by optical head 3, the position deviation of magnetic head 310 in the track direction with respect to optical head 3 can be detected. By using the detected position deviation, deviation in the track direction, as well as the tracking direction, can be eliminated.

By the rotation of 90 degrees for magnetic head 310 that has only two magnetic elements 310A and 310B, the position of magnetic head 310 can be adjusted in both the tracking direction and the track direction even if absent of four magnetic elements 213–216 as in magnetic head 210 of FIG. 10.

An example of a rotation mechanism to rotate magnetic head 310 90 degrees will be described with reference to FIGS. 15A and 15B.

Figure 15A:
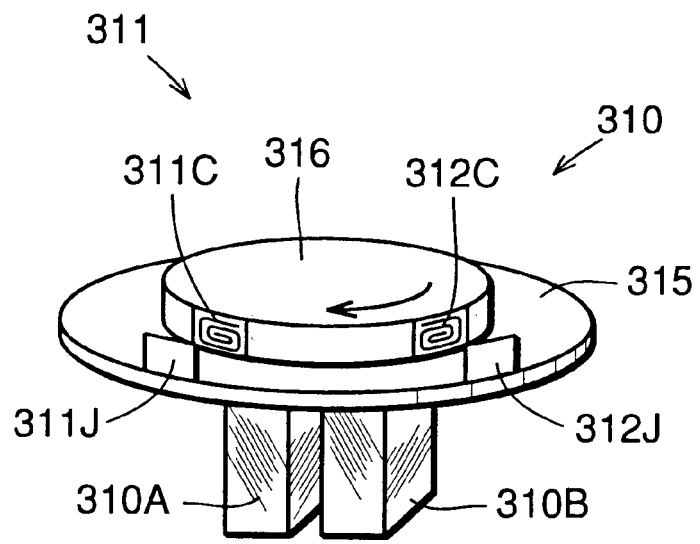
FIG. 15A is a perspective view showing a structure of the rotation mechanism to rotate the magnetic head of FIG. 14.
Figure 15B:
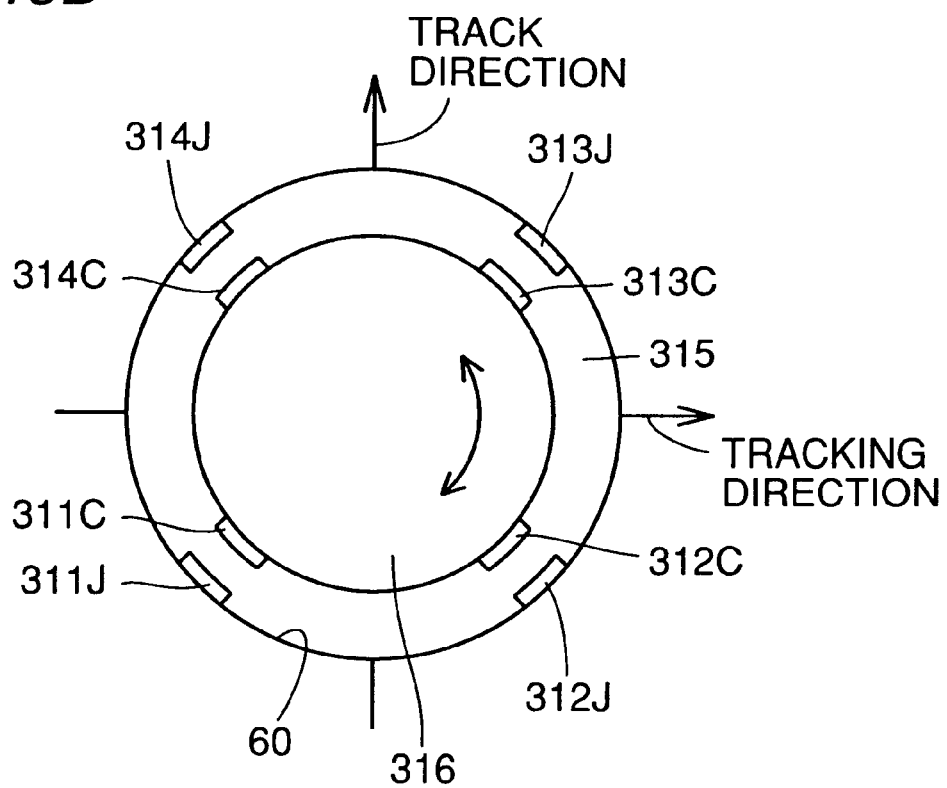
FIG. 15B is a top view of the rotation mechanism of FIG. 15A.

As shown in FIG. 15A, a cylinder 316 of a diameter smaller than a disc 315 is secured on disc 315 to fix magnetic elements 310A and 310B. As shown in FIG. 15B, four flat coils 311C, 312C, 313C and 314C are attached for every 90 degrees at the side face of cylinder 316. Magnetic head 310 and cylinder 316 are supported by a shaft (not shown) to be rotatable within the main plane of magneto-optical disk 1.

Four magnets 311J, 312J, 313J and 314J are provided opposite the four flat coils 311C, 312C, 313C and 314C. Magnets 311J, 312J, 313J and 314J are attached to a fixed sidewall 60 that does not rotate. Magnets 311J and 313J are attached so that their S poles are located inwards. Magnets 312J and 314J are attached so that their N poles are located inwards.

Cylinder 316, flat coils 311C, 312C, 313C and 314C and magnets 311J, 312J, 313J and 314J form a rotation mechanism 314 that rotates magnetic head 310 90 degrees. When currents of the same direction are conducted to flat coils 311C and 313C to generate a magnetic field that has the N pole located outside and conducting currents of a direction opposite to that above to flat coils 312C and 314C to generate a magnetic field that has the S pole located outside, magnetic head 310 becomes stationary by the attraction between flat coils 311C, 312C, 313C and 314C and magnets 311J, 312J, 313J and 314J. When the direction of the currents flowing to flat coils 311C, 312C, 313C and 314C is set opposite under this state, magnetic head 310 begins to rotate by the repulsion and then stops by attraction upon rotation of 90 degrees.

[Another Example of Magneto-optical Disk Apparatus]

Figure 16:
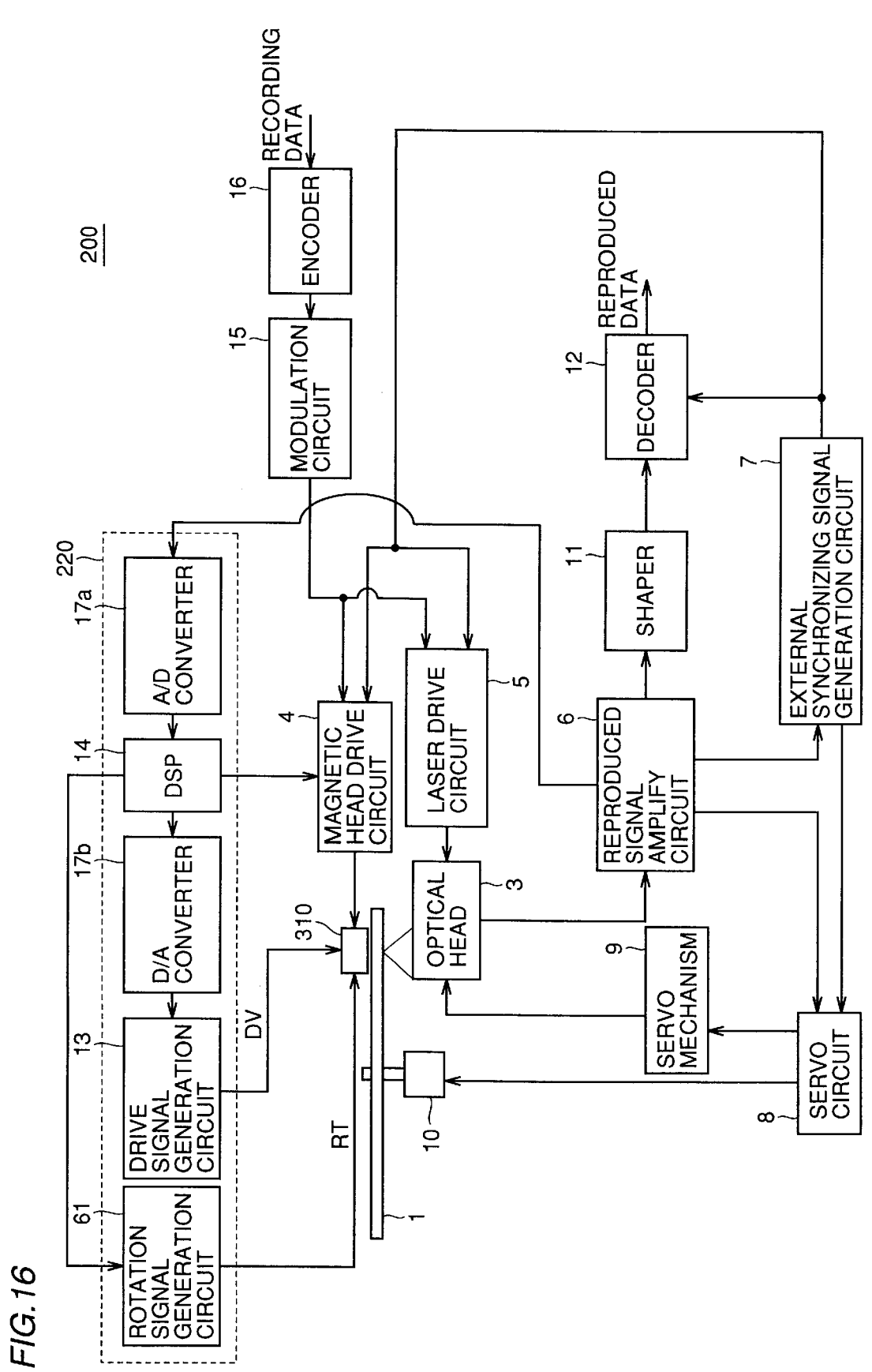
FIG. 16 is a block diagram showing an entire structure of a magneto-optical disk apparatus employing the magnetic head of FIG. 14.

A magneto-optical disk employing the above-described rotatable magnetic head 310 will be described with reference to FIG. 16.

A magneto-optical disk apparatus 200 includes a position adjustment circuit 220 instead of position adjustment circuit 110 of magneto-optical disk apparatus 100 shown in FIG. 12. Position adjustment circuit 220 includes a rotation signal generation circuit 61 that generates a rotation signal RT to rotate magnetic head 310, in addition to the structure of position adjustment circuit 110.

[Process of DSP]

Figure 17:
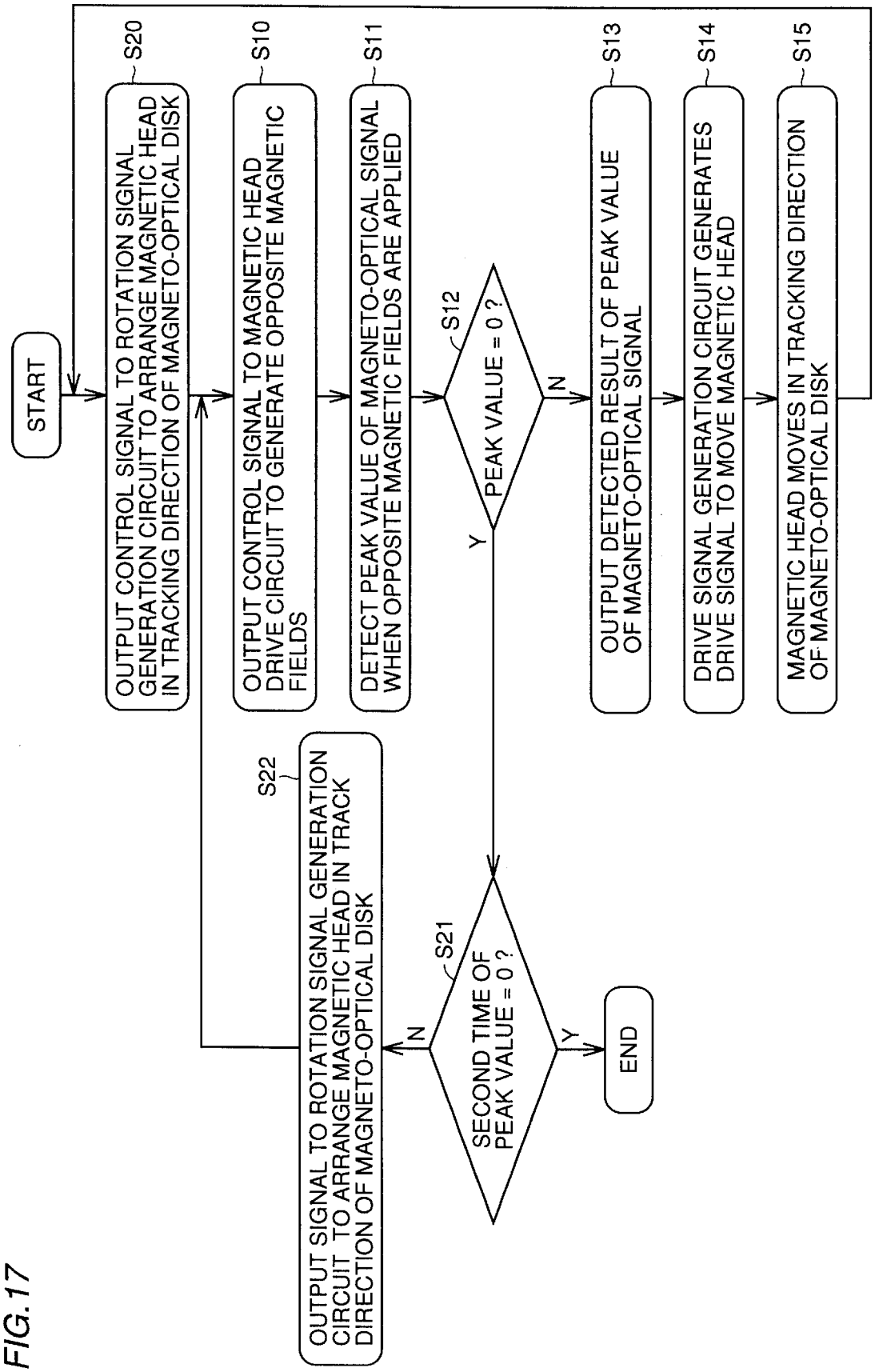
FIG. 17 is a flow chart showing the process of the DSP in FIG. 16.

The position adjustment operation of magnetic head 310 according to magneto-optical disk apparatus 200 will be described with reference to the flow chart of FIG. 17.

At step S20, DSP 14 supplies a control signal to rotation signal generation circuit 61 so that magnetic head 310 is rotated to have magnetic elements 310A and 310B arranged in the tracking direction of magneto-optical disk 1. Accordingly, rotation signal RT is supplied to rotation mechanism 311 shown in FIGS. 15A and 15B from rotation signal generation circuit 61. In response to rotation signal RT, current flows through flat coils 311C, 312C, 313C and 314C, whereby magnetic head 310 rotates 90 degrees. As a result, magnetic elements 310A and 310B are arranged in the tracking direction.

Figure 13:
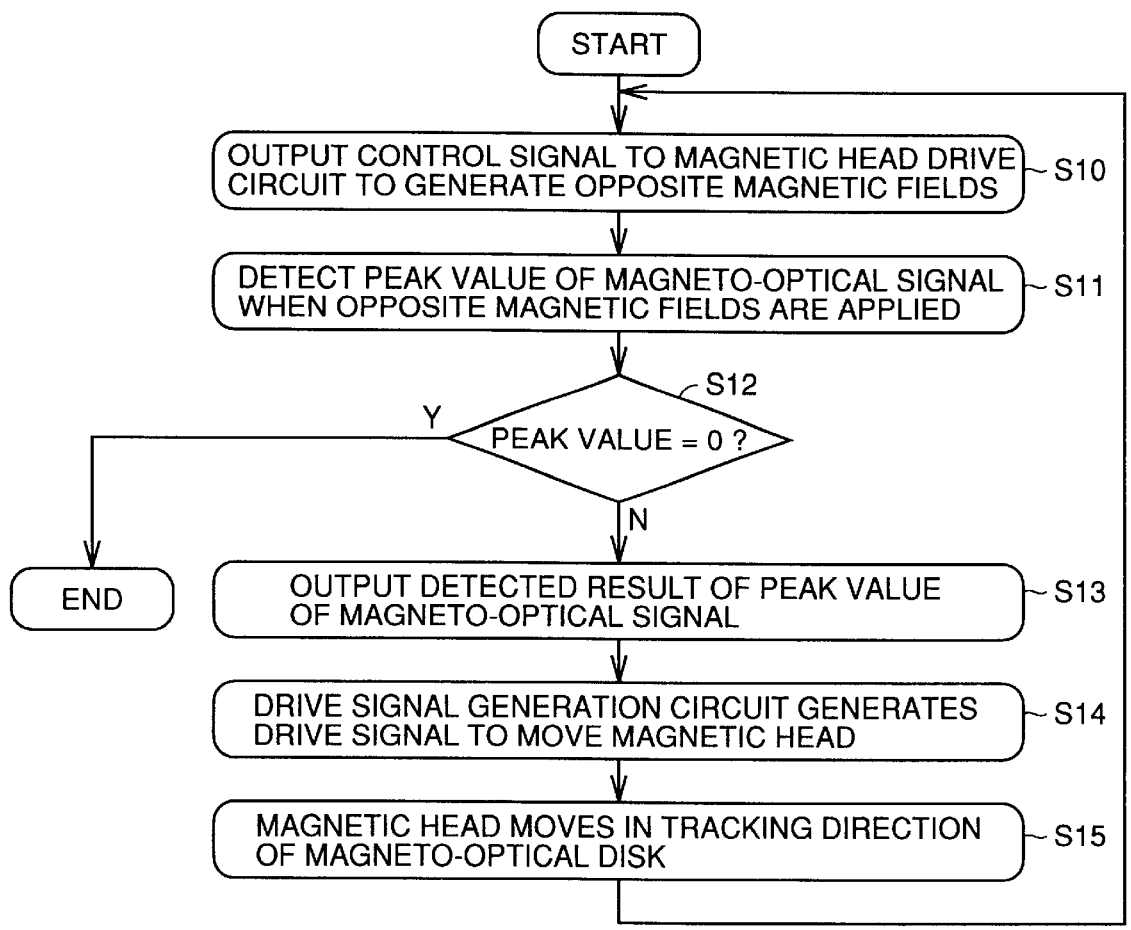
FIG. 13 is a flow chart showing the process of the DSP in FIG. 12.

Then, the process of steps S10–S15 is carried out similar to FIG. 13, provided that control proceeds to step S21 if the peak value of the magneto-optical signal is 0 at step S12.

At step S21, DSP 14 determines whether the peak value attains 0 for the second time or not. The occurrence of the peak value attaining 0 implies that only position deviation in the tracking position has been eliminated. Control proceeds to step S22 to eliminate position deviation in the track direction. In the case where the peak value attains 0 for the second time, the position adjustment operation ends since position deviation in both the tracking direction and the track direction has been eliminated.

More specifically, at step S22, DSP 14 supplies a control signal to rotation signal generation circuit 6 1 so that magnetic head 310 is rotated 90 degrees for the alignment of magnetic elements 310A and 310B in the track direction of magneto-optical disk 1. Accordingly, rotation signal RT is supplied from rotation signal generation circuit 61 to rotation mechanism 311 shown in FIGS. 15A and 15B. In response to this rotation signal RT, the current flowing through flat coils 311C, 312C, 313C and 314C is inverted, whereby magnetic head 310 rotates 90 degrees. As a result, magnetic elements 310A and 310B are arranged in the track direction of magneto-optical disk 1. Then, the process of steps S10–S15 and S21 is carried out.

In the above-described embodiment, position adjustment is carried out after position deviation in the tracking direction is detected, and then position adjustment is effected after detecting position deviation in the track direction. Conversely, position adjustment can be carried out after detecting position deviation in the track direction, and then position adjustment can be carried out in response to detection of position deviation in the tracking direction. Alternatively, position adjustment of both the tracking direction and the track direction can be carried out after detecting the position deviation of both the tracking direction and the track direction.

[Still Another Example of Magnetic Head]

The magnetic element employed in a magnetic head is not limited to that formed of a core and a coil. The so-called thin film coil can be used instead.

Figure 18A:
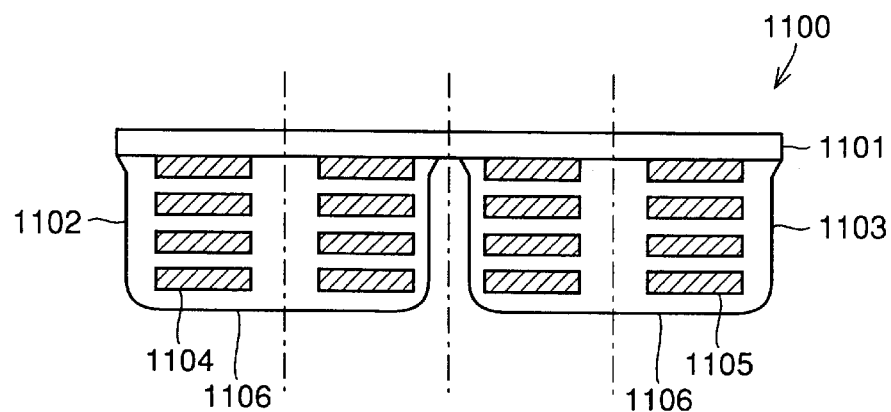
FIG. 18A is a sectional view showing another example of a magnetic head having two magnetic elements.
Figure 18B:
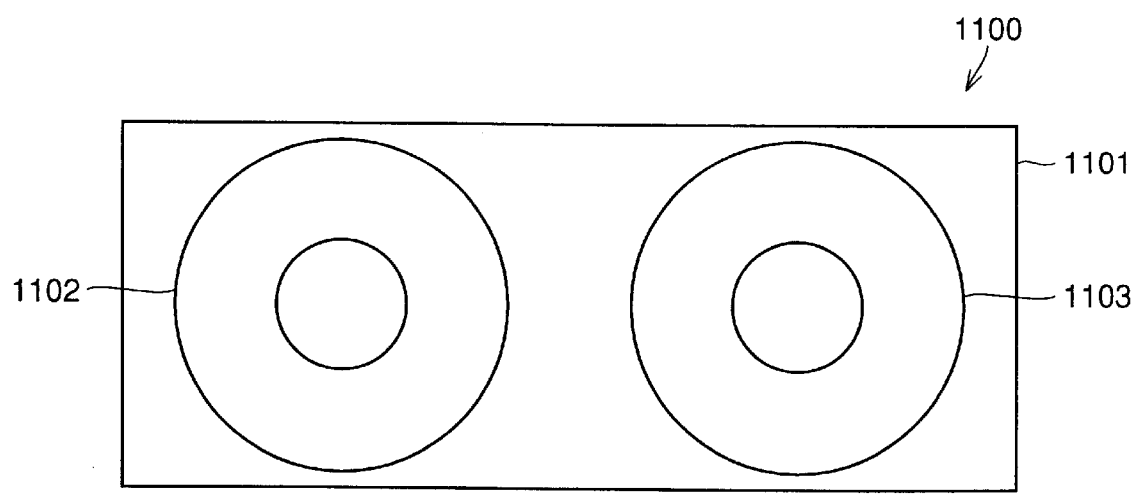
FIG. 18B is a plan view of the magnetic head of FIG. 18A.

Referring to FIGS. 18A and 18B, a magnetic head 1100 includes thin film coils 1102 and 1103 formed on a substrate 1101. Each of thin film coils 1102 and 1103 forms one magnetic element. Thin film coil 1102 includes a four-layered ring 1104 insulated by an organic resist 1106. Similarly, thin film coil 1103 includes a four-layered ring 1105 insulated by organic resist 1106. The film thickness per one layer of rings 1104 and 1105 is approximately 1.0 $\mu$m. The inner diameter is 1.0 $\mu$m, and the outer diameter is 2.0 $\mu$m. Copper (Cu), for example, is employed as the material of rings 1104 and 1105. By repeating deposition of a copper thin film and patterning, thin film coils 1102 and 1103 formed of four-layered rings 1104 and 1105 of the aforementioned inner diameter and outer diameter can be easily produced.

By using and rotating magnetic head 1110 including two thin film coils 1102 and 1103 90 degrees instead of magnetic head 310 shown in FIG. 14, position deviation in both the tracking direction and the track direction can be eliminated.

[Yet a Further Embodiment of Magnetic Head]

Figure 19:
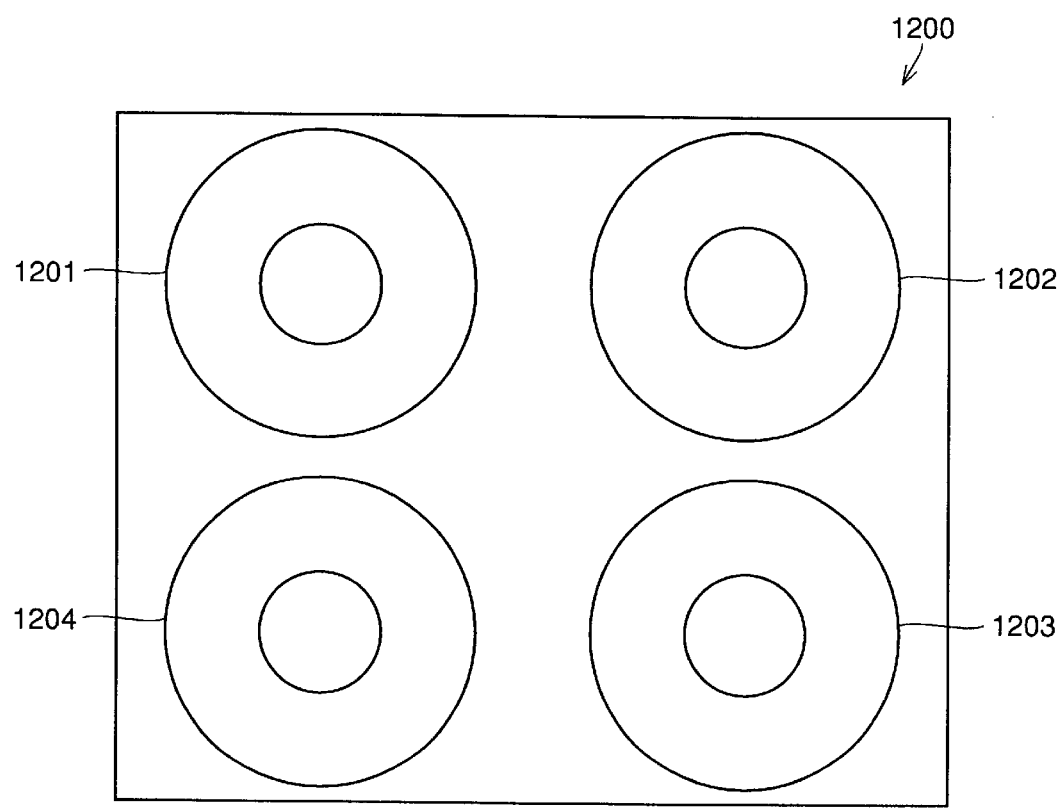
FIG. 19 is a plan view showing yet a further example of a magnetic head including four magnetic elements.

Referring to FIG. 19, a magnetic head 1200 includes four thin film coils 1201–1204. Each of thin film coils 1201–1204 forms one magnetic element. The cross sectional structure, size and material of thin film coils 1201–1204 are identical to those of thin film coils 1102 and 1103 shown in FIGS. 18A and 18B. In magnetic head 1200, thin film coils 1201 and 1202 are arranged in the tracking direction, and also thin film coils 103 and 1204 are arranged in the tracking direction. Thin film coils 1201 and 1204 are arranged in the track direction, and also thin film coils 1202 and 1203 are arranged in the track direction. By employing magnetic head 1200 instead of magnetic head 210 of FIG. 10, position deviation in both the tracking direction and the track direction can be eliminated without having to rotate the magnetic head.

Although the region of the magneto-optical disk to which magnetic fields of directions opposite to each other are applied for the purpose of adjusting the position of the magnetic head is not particularly limited, position adjustment can be carried out at a particular region provided for the purpose of position adjustment. In other words, a region may be provided to carry out position adjustment at a predetermined interval in the radial direction of the magneto-optical disk. Alternatively, a region for position adjustment can be provided at the outermost circumference and innermost circumference of the magneto-optical disk.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magneto-optical disk apparatus comprising:

an optical head provided to face a magneto-optical disk, and a magnetic head provided to face said magneto-optical disk at a side opposite said optical wherein said magnetic head applies a first magnetic field and a second magnetic field of a direction opposite to said first magnetic field within a beam spot formed on said magneto-optical disk by a laser beam emitted from said optical head to said magneto-optical disk.

2. The magneto-optical disk apparatus according to claim 1, wherein said magnetic head comprises:

a first magnetic element generating said first magnetic field, and a second magnetic element close to said first magnetic element, and generating said second magnetic field.

3. The magneto-optical disk apparatus according to claim 2, wherein each of said first and second magnetic elements comprises:

a core, and a coil wound around said core.

4. The magneto-optical disk apparatus according to claim 2, wherein each of said first and second magnetic elements comprises a thin film coil.

5. The magneto-optical disk apparatus according to claim 2, wherein said first and second magnetic elements are arranged in a radial direction of said magneto-optical disk.

6. The magneto-optical disk apparatus according to claim 2, wherein said first and second magnetic elements are arranged in a tangential direction of tracks of said magneto-optical disk.

7. The magneto-optical disk apparatus according to claim 1, wherein said magnetic head comprises:

a first magnetic element generating said first magnetic field, a second magnetic element close to said first magnetic element in a radial direction of said magneto-optical disk, and generating one of said first magnetic field and said second magnetic field, a third magnetic element close to said first magnetic element in a tangential direction of tracks of said magneto-optical disk, and generating one of said first magnetic field and said second magnetic field, and a fourth magnetic element close to said third magnetic element in a radial direction of said magneto-optical disk, and generating said second magnetic field.

8. The magneto-optical disk apparatus according to claim 1, further comprising a position adjustment unit adjusting a position of said magnetic head in response to a magneto-optical signal output from said optical head.

9. The magneto-optical disk apparatus according to claim 8, wherein said position adjustment unit comprises:

a position adjustment circuit generating a drive signal to adjust a position of said magnetic head in response to the magneto-optical signal output from said optical head, and a position adjustment mechanism moving said magnetic head in a radial direction of said magneto-optical disk and/or in a tangential direction of tracks of said magneto-optical disk in response to the drive signal from said position adjustment circuit.

10. The magneto-optical disk apparatus according to claim 9, wherein said position adjustment circuit comprises:

a detection circuit detecting a level of the magneto-optical signal output from said optical head, and a drive signal generation circuit generating said drive signal in response to the level of the magneto-optical signal detected by said detection circuit.

11. The magneto-optical disk apparatus according to claim 2, further comprising a position adjustment unit adjusting a position of said magnetic head in response to a magneto-optical signal output from said optical head, wherein said position adjustment unit comprises a rotation mechanism rotating said magnetic head within a main plane of said magneto-optical disk to arrange said first and second magnetic elements in a radial direction of said magneto-optical disk or a tangential direction of tracks of said magneto-optical disk.

* * * * *